United States Patent [19]

Longer

[11] Patent Number: 5,216,833
[45] Date of Patent: Jun. 8, 1993

[54] HERBICIDE APPLICATOR

[76] Inventor: David E. Longer, 2387 Twelve Oaks Dr., Fayetteville, Ark. 67603

[21] Appl. No.: 755,853

[22] Filed: Sep. 6, 1991

[51] Int. Cl.$^5$ .................................. A01G 13/00
[52] U.S. Cl. ............................................. 47/1.5
[58] Field of Search ............... 47/1.5, 1.01; 118/207

[56] References Cited

U.S. PATENT DOCUMENTS

| | | |
|---|---|---|
| 1,606,860 | 6/1926 | Winn . |
| 2,659,918 | 11/1953 | Stoner ................... 47/1.5 |
| 2,817,189 | 12/1957 | Esmay ................... 57/1.5 |
| 2,841,923 | 7/1958 | Dickison ................ 47/1.5 |
| 2,979,757 | 4/1961 | Smith .................... 47/1.5 |
| 3,096,534 | 7/1963 | Jones . |
| 3,232,006 | 2/1966 | Atherton et al. ........ 47/1.5 |
| 4,027,986 | 6/1977 | Patrick .................. 47/1.5 |
| 4,278,360 | 7/1981 | Lorscheid et al. ....... 47/1.5 |
| 4,305,224 | 12/1981 | Maddock ................ 47/1.5 |
| 4,882,874 | 11/1989 | Paulson et al. .......... 47/1.5 |

FOREIGN PATENT DOCUMENTS

| | | |
|---|---|---|
| 2333408 | 6/1977 | France ................... 47/1.5 |
| 265270 | 5/1964 | Netherlands ........... 47/1.5 |
| 2119482 | 11/1983 | United Kingdom ..... 47/1.5 |
| 2120915 | 12/1983 | United Kingdom ..... 47/1.5 |

Primary Examiner—Richard E. Chilcot, Jr.
Assistant Examiner—Joanne C. Downs
Attorney, Agent, or Firm—Hovey, Williams, Timmons & Collins

[57] ABSTRACT

A fluid applicating apparatus is provided for use with a cartridge 10 having a self-sealing, penetrable membrane 16 and an inner volume containing fluid to be dispensed. The applicating apparatus includes an applicator 48 located at one end of an elongated body 20, the applicator being formed of a porous, compressible material. The flow of fluid between the inner volume of the cartridge 10 and the applicator 48 is controlled by providing a penetrating member 34 movable between a first position in which it penetrates the membrane 16 and permits fluid communication between the inner volume and the applicator 48 and a second position in which it is extracted from the inner volume. The membrane 16 seals off the inner volume upon removal of the penetrating member such that fluid does not leak from the inner volume when the penetrating member is withdrawn.

4 Claims, 1 Drawing Sheet

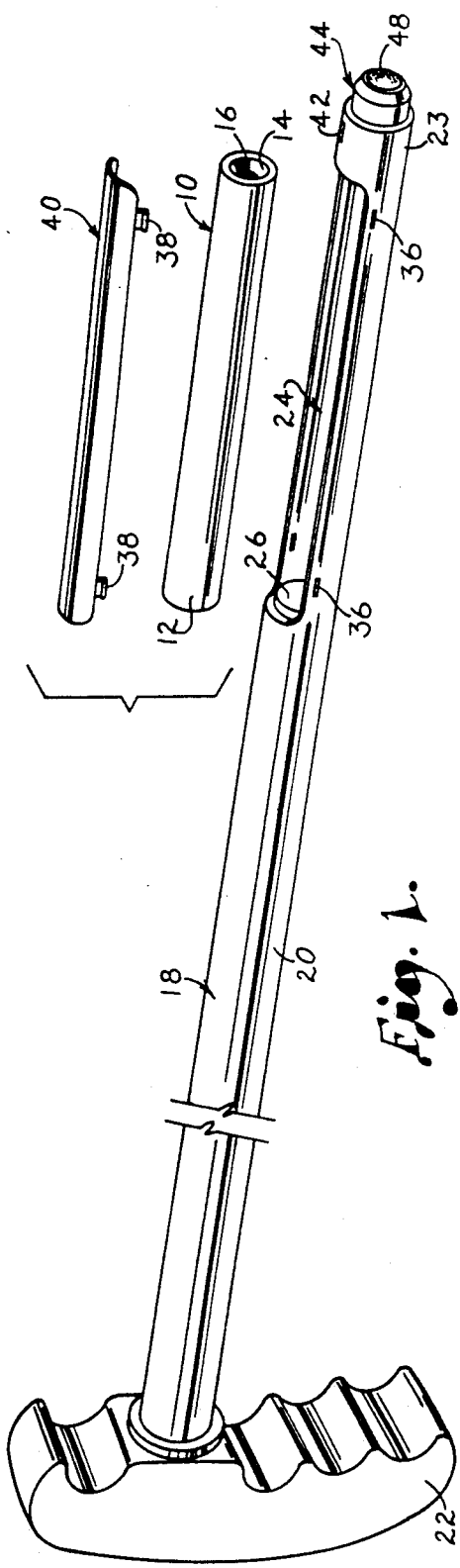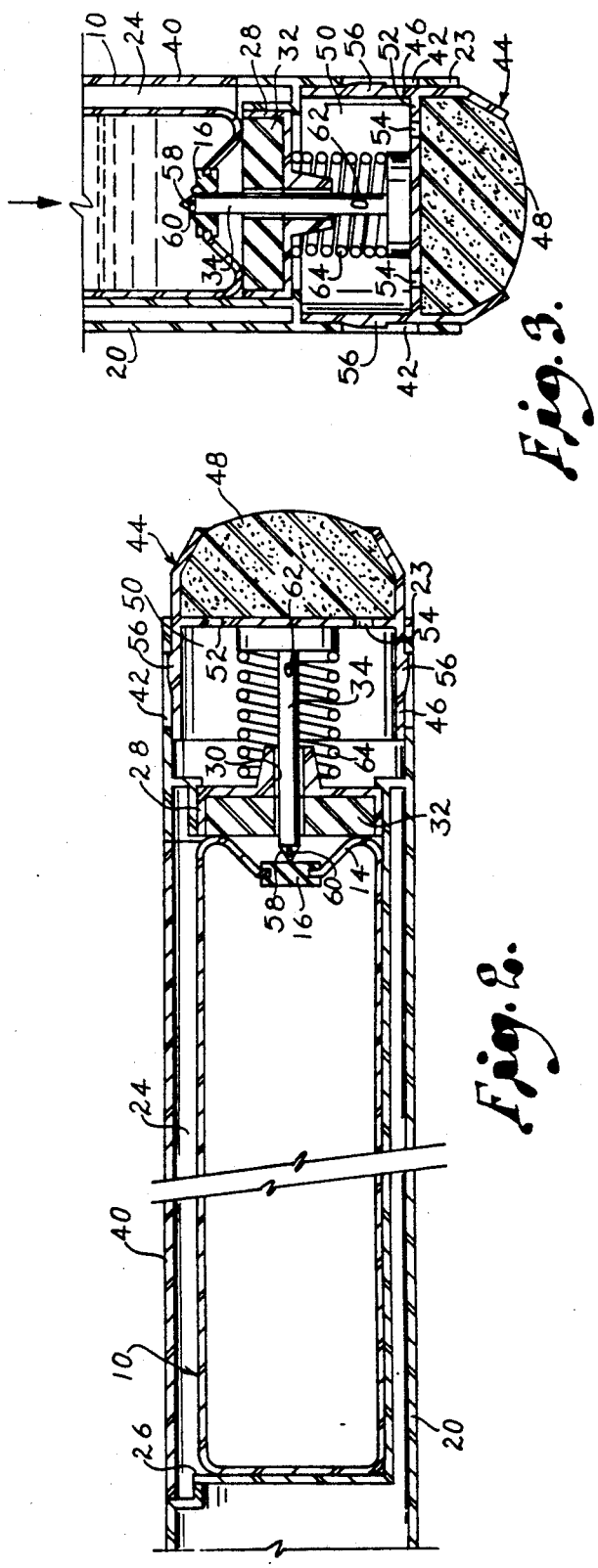

HERBICIDE APPLICATOR

BACKGROUND OF THE INVENTION

1. Field of the Invention

The present invention relates generally to fluid applicating devices and, more particularly, to a herbicide applicator adapted for use with cartridges that are filled with herbicide and which may be replaced in the apparatus when empty.

2. Discussion of the Prior Art

A weed eliminator is shown in U.S. Pat. No. 1,606,860, to Winn, which carries a weed killing liquid and permits distribution of the liquid in small amounts onto weeds and the like without allowing any of the liquid to drop onto adjacent plants. The device includes a tube in which the weed killing liquid is stored, and a sleeve retained for sliding movement on by the tube and provided with a sponge that is retained in fluid communication with the tube. The sleeve is movable between an extended position in which the sponge is full of liquid but does not dispense the liquid, and a retracted position in which the sponge is compressed to squeeze the liquid therefrom.

Numerous problems have been encountered in the use of conventional applicators such as this known weed eliminator. For example, in conventional devices, weed killing liquid must be poured from a storage container into the applicating device in order to replenish the liquid when the applicating device is empty.

Also, once the applicating device has been filled with weed killing liquid, the liquid leaks from the device through the sponge and no structure is provided for preventing such leakage. Thus, there is an opportunity for the liquid to drip on and kill desirable plants which may result in the destruction of valuable plants or crops.

Another type of conventional dispensing device includes a pressurized source of weed killing liquid which is sprayed onto undesirable plants by a spray gun or the like connected with the pressurized source of liquid. However, the use of pressurizing means to permit spraying of the liquid is dangerous, and it is not possible to exactly control application of the liquid such that no liquid is permitted to contact desirable plants adjacent those to be killed.

OBJECTS AND SUMMARY OF THE INVENTION

It is an object of the present invention to provide a safe, easy-loading herbicide applicator adapted for use with cartridges that are filled with herbicide and which may be replaced in the apparatus when empty without requiring that the liquid be poured from a container into the apparatus.

It is another object of the invention to provide a herbicide applicator including a nonpressurized source of liquid herbicide which permits the herbicide to be applied by contact between the applicator and a plant to be killed, without requiring the liquid herbicide to be sprayed.

In accordance with these and other objects, and in conformity with one aspect of the present invention, a fluid applicating apparatus is provided for use with a cartridge having a self-sealing, penetrable membrane and an inner volume containing fluid to be dispensed.

The apparatus includes a body having mounting means for supporting the cartridge, and an applicator located at one end of the body and formed of a porous, compressible material adapted to permit fluid to be applied to a surface with which the applicator is brought into contact. The flow of fluid between the inner volume of the cartridge and the applicator is controlled by flow permitting means for penetrating the membrane and bringing the inner volume into fluid communication with the applicator, and by cut-off means for cutting off the fluid communication between the inner volume and the applicator. A penetrating member is movable between a first position in which it penetrates the membrane and permits fluid communication between the inner volume and the applicator and a second position in which it is extracted from the inner volume. The membrane seals off the inner volume upon removal of the conduit such that fluid does not leak from the inner volume when the penetrating member is in the second position.

By this construction, numerous advantages are realized. For example, by employing cartridges filled with the liquid to be dispensed, it is possible to refill the apparatus with liquid simply by replacing an empty cartridge with a full cartridge, without having to pour the liquid from a storage container into the apparatus. Thus, resupplying the liquid in the apparatus is safe and easy, with no risk of the liquid being poured or dripped onto a lawn or other area where filling of the apparatus is carried out.

Another advantage of the inventive construction resides in the use of an applicator which may be placed in fluid communication with the inner volume of the cartridge such that the liquid to be dispensed is transmitted to the applicator and may be applied to any undesired plant by bringing the applicator into contact with the plant.

Also, by controlling the flow between the inner volume of the cartridge and the applicator, it is possible to restrict the amount of liquid available in the applicator such that the liquid is retained in the applicator without dripping from the apparatus. In this manner, it is possible to apply the liquid to only locations where such application is desired, with no resultant loss of plants or crops located adjacent the desired points of application.

BRIEF DESCRIPTION OF THE DRAWING FIGURES

A preferred embodiment of the present invention is described in detail below with reference to the attached drawing figures, wherein:

FIG. 1 is an exploded perspective view of a herbicide applicator constructed in accordance with a preferred embodiment of the present invention, illustrating a cartridge adapted for use with the applicator and a cover;

FIG. 2 is a sectional view of one end of the applicator illustrating the cartridge and a tip assembly of the applicator, with the tip assembly located in an extended position; and FIG. 3 is a sectional view of one end of the applicator illustrating the cartridge and a tip assembly of the applicator, with the tip assembly located in a retracted position.

DETAILED DESCRIPTION OF THE PREFERRED EMBODIMENT

A fluid applicating apparatus constructed in accordance with a preferred embodiment of the present invention is shown in FIG. 1, as is a cartridge 10 adapted for use with the apparatus.

The cartridge 10 is preferably formed of plastic and is in the shape of a cylinder having a closed end 12 and an open end 14. The open end is closed off by a cap provided with a membrane 16 formed of rubber or the like, similar to caps used on medicine bottles, which permits the passage of a sharpened pin or needle-like member into the inner volume defined by the cartridge. The material of the membrane 16, while permitting passage of a pin or other sharpened member, is thick enough to be self-sealing so that upon removal of the pin or member, the membrane re-seals and prevents the leakage of any fluid from the inner volume.

The apparatus includes a handle portion 18 formed of an elongated body 20 having first and second axial ends. A handle is provided at one of the axial ends for permitting the apparatus to be carried and operated manually, as well as to define a surface by which the apparatus may be hung during storage.

The end 23 of the elongated body 20 opposite the handle 22 is open, and a cartridge chamber 24 is provided adjacent the open end and includes a cylindrical side wall adapted to receive the plastic cartridge. An end wall 26 is formed in the cartridge chamber and defines a surface against which the closed end 12 of the cartridge rests when the cartridge is in place in the cartridge chamber. The cartridge chamber 24 also includes a front end region opposite the end wall, as shown in FIG. 2.

The front end region includes an annular collar 28 which closes off the cartridge chamber 24 from the open end 23 of the elongated body except for a central orifice 30 extending through the collar in a direction parallel to the axis of the elongated body. A rubber gasket 32 is supported on the collar 28 and provides a compressible bearing surface against which the open end of the cartridge 10 is pressed during loading of the cartridge. The gasket 32 includes an orifice aligned with the orifice 30 of the collar and sized to engage a penetrating member 34 in order to prevent fluid passage between the gasket 32 and the penetrating member 34.

Returning to FIG. 1, the cylindrical side wall of the cartridge chamber 24 is provided with a plurality of holes 36 adapted to receive detent members 38 of a plastic cover 40 which fits over the cartridge 10 after the cartridge has been loaded, and holds the cartridge in place within the chamber 24. The cover 40 may be provided with a plurality of circumferential ridges (not shown) on the inner surface thereof which engage the cartridge 10 and hold the cartridge against the cylindrical side wall of the chamber 24 once the cover is snapped into place.

The open end 23 of the elongated body 20 extends axially inward to the collar 28 and includes a plurality of transverse slots 42. A tip assembly 44 is disposed within the open end of the apparatus and includes support means for supporting an applicator. As shown in FIG. 2, the support means includes a generally cylindrical hollow body 46 having one end which is tapered to receive and retain an applicator 48, and a second end which defines a reservoir 50, as discussed more fully below. The reservoir 50 is separated from the applicator 48 by a transverse plate 52 provided within the body 46. The plate 52 includes a plurality of holes 54 extending therethrough which place the reservoir in fluid communication with the applicator.

The applicator 48 is preferably formed of a porous, compressible material adapted to permit fluid to be applied to a surface with which the applicator is brought into contact. The material used in the applicator is sponge-like and is chosen for its ability to permit the passage of liquid from the reservoir 50 to a plant or surface to which the fluid is to be applied while preventing liquid from dripping or otherwise leaking from the reservoir through the applicator. An open-celled neoprene material having an average pore diameter less than about 0.10 millimeters has been found to achieve both of these objects satisfactorily.

The outside surface of the body 46 of the tip assembly is provided with a plurality of nibs 56 aligned with and extending into the transverse slots 42 formed in the elongated body 20 of the handle portion. These nibs 56 retain the tip assembly 44 on the handle portion 18 and guide the tip assembly for linear axial movement relative to the handle portion between an extended position, shown in FIG. 2, and a retracted position, shown in FIG. 3.

The penetrating member 34 is attached to the transverse plate 52 of the tip assembly and extends axially into the open end of the elongated body 20 through the collar 28 and the gasket 32. The penetrating member 34 includes a point 58 which extends just beyond the gasket 32 when the tip assembly 44 is in the extended position and which penetrates the cartridge chamber 24 when the tip assembly is moved to the retracted position. The penetrating member 34 is hollow and preferably includes an inlet orifice 60 formed in the point and an outlet orifice 62 opening into the reservoir 50.

Biasing means are provided for biasing the tip assembly 44 toward the extended position. The biasing means preferably includes a compression spring 64 disposed within the open end of the elongated body 20 and extending between the collar 28 and a bearing element attached to the transverse plate 52.

The tip assembly 44, together with the penetrating member 34 controls the flow of fluid between the inner volume of the cartridge 10 and the applicator 48. When a cartridge filled with a liquid herbicide is positioned with the cartridge chamber 24, and the tip assembly 44 is moved to the retracted position, e.g. by holding the apparatus and pressing the tip assembly against the ground, the penetrating member 34 penetrates the membrane 16. When the tip assembly is in this position, fluid flows from the inner volume of the cartridge 10 through the hollow penetrating member 34 into the reservoir 50, and the reservoir is allowed to fill.

Thereafter, the apparatus is pulled from contact with the ground and the spring 64 urges the tip assembly to the extended position. While the tip assembly is in the extended position the penetrating member 34 is withdrawn from the inner volume so that the inner volume is no longer in fluid communication with the reservoir 50. As mentioned, the membrane 16 is formed of a material which seals itself upon removal of the penetrating member so as to prevent the leakage of liquid herbicide from the inner volume when the penetrating member is removed. The apparatus may then be used to apply the liquid herbicide to undesired plants by merely contacting the leaves of the plants with the applicator so that liquid from the applicator rubs off on the leaves.

After the liquid herbicide in the reservoir is depleted, the tip assembly 44 may then be moved back to the retracted position in order to refill the reservoir 50. In this manner, only a predetermined volume of liquid herbicide is available to the applicator 48 at any given time in order to prevent dripping or leakage of the liquid.

Once the liquid herbicide available in the cartridge 10 is used up, the cover 46 is removed and the cartridge may be replaced by a new cartridge.

Although the invention has been described with reference to the illustrated, preferred embodiment, it is noted that substitutions may be made and equivalents employed herein without departing from the scope of the invention as recited in the claims.

What is claimed is:

1. A fluid applicating apparatus comprising:
   a disposable cartridge provided with an outer wall defining an inner volume containing fluid to be dispensed;
   an elongated body having opposed axial ends, a circumferential wall extending between the ends, and a cartridge chamber intermediate the ends for supporting the cartridge, the body including an inner wall defining one axial end of the cartridge chamber and a transverse annular collar defining an opposing end wall of the chamber, the annular collar including a central hole,
   a tip assembly supported on the body for movement relative to the body, the tip assembly including
   a cylindrical wall,
   a transverse plate which together with the cylindrical wall of the assembly, the circumferential wall of the body, and the collar, defines a fluid reservoir, the transverse plate including at least one hole passing through the plate,
   a penetrating member for penetrating the inner volume of the cartridge through the hole in the collar when the tip assembly is moved to a retracted position relative to the body to bring the inner volume into fluid communication with the fluid reservoir, and
   a spring for biasing the tip assembly toward an extended position in which the penetrating member is extracted from thinner volume;
   an applicator supported on the tip assembly opposite the transverse plate from the fluid reservoir, the applicator being formed of a porous, compressible material adapted to permit fluid to be applied to a surface with which the applicator is brought into contact; and
   a means for enabling removal of the cartridge from the chamber in order to permit replacement of an empty cartridge with one full of liquid to be dispensed.

2. A fluid applicating apparatus as recited in claim 1, wherein the circumferential wall of the body includes a plurality of axially extending slots located outside the cartridge chamber adjacent the collar, and the cylindrical wall of the tip assembly includes a plurality of radially extending tabs sized for receipt in the slots for guiding movement of the tip assembly relative to the body.

3. A fluid applicating apparatus as recited in claim 1, further comprising a cover positionable over the cartridge chamber of the body for retaining the cartridge in the chamber, the cover being removable from the body to permit access to the cartridge.

4. A fluid applicating apparatus as recited in claim 1, wherein the body includes a handle supported at the axial end of the body opposite the tip assembly.

* * * * *